(12) United States Patent
Nobuhara

(10) Patent No.: US 10,599,135 B2
(45) Date of Patent: Mar. 24, 2020

(54) OFFLINE TEACHING DEVICE FOR ROBOT

(71) Applicant: FANUC CORPORATION, Minamitsuru-gun, Yamanashi (JP)

(72) Inventor: Atsushi Nobuhara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 93 days.

(21) Appl. No.: 15/926,245

(22) Filed: Mar. 20, 2018

(65) Prior Publication Data

US 2018/0299874 A1 Oct. 18, 2018

(30) Foreign Application Priority Data

Apr. 17, 2017 (JP) .................................. 2017-081319

(51) Int. Cl.
*G05B 19/425* (2006.01)
*B25J 9/16* (2006.01)
*G05B 19/409* (2006.01)

(52) U.S. Cl.
CPC ............ *G05B 19/425* (2013.01); *B25J 9/163* (2013.01); *B25J 9/1664* (2013.01);
(Continued)

(58) Field of Classification Search
CPC ............... G05B 19/425; G05B 19/409; G05B 2219/40516; G05B 2219/36484; G05B 2219/40311; B25J 9/163; B25J 9/1664
See application file for complete search history.

(56) References Cited

U.S. PATENT DOCUMENTS

2007/0083291 A1 4/2007 Nagatsuka et al.
2011/0054685 A1* 3/2011 Wada ..................... B25J 9/1664
700/252
(Continued)

FOREIGN PATENT DOCUMENTS

CN 1947961 4/2007
CN 102375450 3/2012
(Continued)

OTHER PUBLICATIONS

Office Action dated Jun. 14, 2019 in Chinese Patent Application No. 201810331929.0.

*Primary Examiner* — Jason Holloway
(74) *Attorney, Agent, or Firm* — Wenderoth, Lind & Ponack, L.L.P.

(57) ABSTRACT

An offline teaching device includes: a storage unit that stores a program; a display control unit that causes a monitor to display four or more coordinate points P1 to P6 based on teaching point data described in the program and one line connecting the four or more coordinate points P1 to P6 successively; and a correction amount generation unit that, after two coordinate points P2 and P5 are selected on the monitor from remaining coordinate points P2 to P5 except the coordinate points P1 and P6 serving as a starting point and an ending point of the line and one coordinate system is selected among a plurality of coordinate systems, generates correction amounts of the coordinate points P2 to P5 without changing the teaching point data on the basis of dragging of a segment between the selected two coordinate points P2 and P5 according to the selected coordinate system.

8 Claims, 8 Drawing Sheets

(52) U.S. Cl.
CPC .. *G05B 19/409* (2013.01); *G05B 2219/36484* (2013.01); *G05B 2219/40311* (2013.01); *G05B 2219/40385* (2013.01); *G05B 2219/40516* (2013.01)

(56) References Cited

U.S. PATENT DOCUMENTS

| | | | | |
|---|---|---|---|---|
| 2015/0151431 | A1* | 6/2015 | Suyama | B25J 9/1671 700/264 |
| 2016/0059413 | A1* | 3/2016 | Ogata | B25J 9/1676 700/186 |
| 2018/0036883 | A1* | 2/2018 | Nishitani | B25J 9/1671 |
| 2018/0264646 | A1* | 9/2018 | Sugaya | B25J 9/161 |

FOREIGN PATENT DOCUMENTS

| | | |
|---|---|---|
| CN | 103419198 | 12/2013 |
| CN | 105382836 | 3/2016 |
| CN | 105643622 | 6/2016 |
| JP | 6-99378 | 4/1994 |
| JP | 11-207671 | 8/1999 |
| JP | 2005-149016 | 6/2005 |
| JP | 2007-249267 | 9/2007 |
| JP | 2014-65107 | 4/2014 |
| JP | 2015-83331 | 4/2015 |
| JP | 2016-140958 | 8/2016 |
| WO | 2014/013605 | 1/2014 |

* cited by examiner

FIG. 2

```
 1: EACH SHAFT      POSITION [1]   100%       REGISTRATION
 2: STRAIGHT LINE   POSITION [2]   200mm/sec  REGISTRATION
 3: STRAIGHT LINE   POSITION [3]   200mm/sec  REGISTRATION
 4: STRAIGHT LINE @ POSITION [4]   200mm/sec  REGISTRATION
 5: STRAIGHT LINE   POSITION [5]   200mm/sec  REGISTRATION
 6: STRAIGHT LINE   POSITION [6]   200mm/sec  REGISTRATION
[END]
```

FIG. 3

```
 1: EACH SHAFT      POSITION [1]    100%       REGISTRATION
 2:     POSITION CORRECTION (1,  125.3,  -50,  45.2)
 3: STRAIGHT LINE   POSITION [2]    200mm/sec  REGISTRATION
 4: STRAIGHT LINE   POSITION [3]    200mm/sec  REGISTRATION
 5: STRAIGHT LINE @ POSITION [4]    200mm/sec  REGISTRATION
 6: STRAIGHT LINE   POSITION [5]    200mm/sec  REGISTRATION
 7:     POSITION CORRECTION (1,  0,  0,  0)
 8: STRAIGHT LINE   POSITION [6]    200mm/sec  REGISTRATION
[END]
```

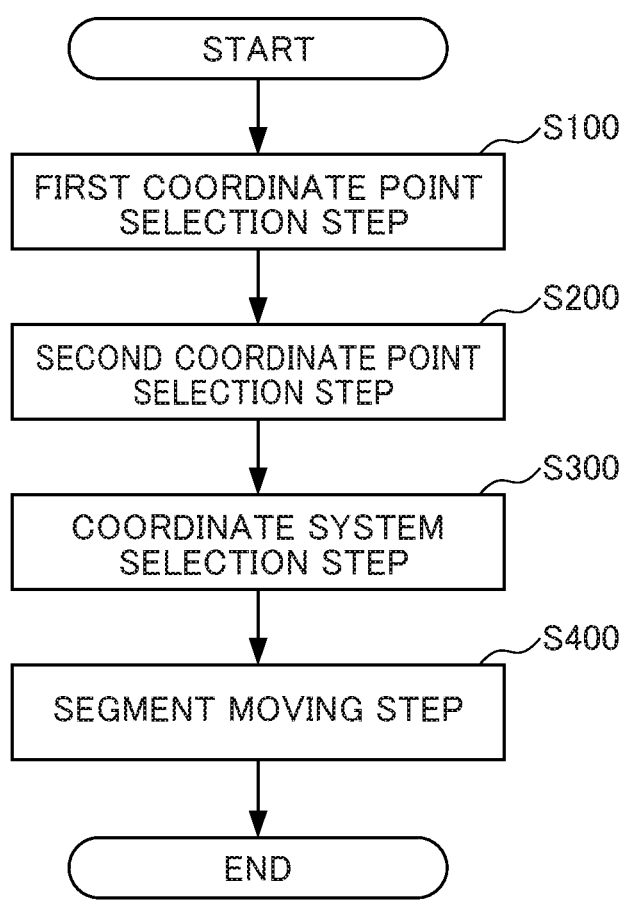

OFFLINE TEACHING DEVICE FOR ROBOT

This application is based on and claims the benefit of priority from Japanese Patent Application No. 2017-081319, filed on 17 Apr. 2017, the content of which is incorporated herein by reference.

BACKGROUND OF THE INVENTION

Field of the Invention

The present invention relates to a robot programming technique, and particularly, to an offline teaching device for teaching a robot's operation offline.

Related Art

Conventionally, an offline teaching device for teaching an operation of a robot offline sometimes corrects a program in order to change a trajectory of the robot's operation offline.

Patent Document 1 discloses a robot operation program correction device. Specifically, Patent Document 1 discloses a program correction procedure of designating a starting point and an ending point as a range of correcting an operation trajectory displayed on a simulation image by operating a mouse and designating a correction point and a moving destination thereof within a correction range by operating a mouse.

Patent Document 2 discloses a robot program correction device. Specifically, Patent Document 2 discloses a program correction procedure of displaying a teaching route, the positions of teaching points, and the like indicated by a robot teaching program on a display during or in the process of creation, designating successive N teaching points, and dragging one teaching point other than endpoints to correct the positions of respective teaching points by movement amounts that are proportionally distributed.

Patent Document 3 discloses a robot simulator. Specifically, the robot simulator of Patent Document 3 displays a rotation handle and displacement handles for X, Y, and Z-directions using a control point as an origin together with a virtual image of a robot. When an operator drags any one of these operating handles, the control point is displaced by an amount of displacement corresponding to the amount of drag.

Patent Document 4 discloses a teaching device for an industrial robot. Specifically, Patent Document 4 discloses a technique of completing a teaching operation by teaching a work starting point and a work ending point and operation requirement data between the two points.

Patent Document 5 discloses a robot operating device. Specifically, Patent Document 5 discloses various examples of teaching a robot movement amount by various drag operations using a touch panel.

Patent Document 1: Japanese Unexamined Patent Application, Publication No. 2014-065107
Patent Document 2: Japanese Unexamined Patent Application, Publication No. 2005-149016
Patent Document 3: PCT International Publication No. WO2014/013605
Patent Document 4: Japanese Unexamined Patent Application, Publication No. H11-207671
Patent Document 5: Japanese Unexamined Patent Application, Publication No. 2015-083331

SUMMARY OF THE INVENTION

However, the robot operation program correction device disclosed in Patent Document 1 moves correction points to correct the program but cannot correct the program of an entire segment designated in the trajectory of the robot's operation.

The robot program correction device disclosed in Patent Document 2 corrects the program by dragging the teaching points to move the teaching points by proportionally distributed movement amounts but cannot correct the program of an entire segment designated in the trajectory of the robot's operation by one correction amount.

The robot simulator disclosed in Patent Document 3 displaces the control points by dragging the operation handles displayed together with the virtual image but cannot correct the program of an entire segment designated in the trajectory of a robot's operation.

The industrial robot teaching device disclosed in Patent Document 4 cannot correct a portion of the operation requirement data and cannot correct the program of an entire segment designated in the trajectory of a robot's operation.

The robot operating device disclosed in Patent Document 5 teaches the robot's movement amount by various dragging operations but cannot correct the program of an entire segment designated in the trajectory of a robot's operation.

In view of the foregoing, an object of the present invention is to provide an offline teaching device for a robot capable of correcting a program in an entire designated segment of a trajectory of a robot's operation.

(1) An offline teaching device (for example, an offline teaching device 1 to be described later) for a robot according to the present invention is an offline teaching device for a robot (for example, a robot RO to be described later), for teaching an operation of the robot offline, including: a storage unit (for example, a storage unit 2 to be described later) that stores a program (for example, a program 6 to be described later) for causing the robot (RO) to perform an operation; a display control unit (for example, a display control unit 3 to be described later) that causes a display unit (for example, a monitor 7 to be described later) on which a cursor (for example, a cursor 8 to be described later) is displayed to display four or more coordinate points (for example, coordinate points P1 to P6 to be described later) based on teaching point data described in the program and causes the display unit to display one line (for example, a line LI to be described later) connecting the four or more coordinate points successively; and a correction amount generation unit (for example, a correction amount generation unit 4 to be described later) that, after two coordinate points are selected on the display unit from remaining coordinate points except the coordinate points serving as a starting point and an ending point of the line and one coordinate system is selected among a plurality of coordinate systems, generates correction amounts of the coordinate points without changing the teaching point data on the basis of dragging of a segment of the line between the selected two coordinate points by the cursor according to the selected coordinate system.

(2) The offline teaching device according to (1) may further include a program inserting unit (for example, a program inserting unit 5 to be described later) that inserts the correction amount data to the program.

(3) In the offline teaching device according to (1) or (2), the correction amount generation unit may select a tool coordinate system among the plurality of coordinate systems.

(4) In the offline teaching device according to any one of (1) to (3), the line connecting the coordinate points successively may be a trajectory of an operation taught to the robot.

According to the present invention, it is possible to correct the program of an entire segment designated in the trajectory of a robot's operation.

BRIEF DESCRIPTION OF THE DRAWINGS

FIG. 2 is a diagram illustrating a program before correction amount data is inserted.

FIG. 3 is a diagram illustrating a program after correction amount data is inserted.

FIG. 4 is a flowchart illustrating the procedure of an input operation in the offline teaching device.

DETAILED DESCRIPTION OF THE INVENTION

Figure 1:
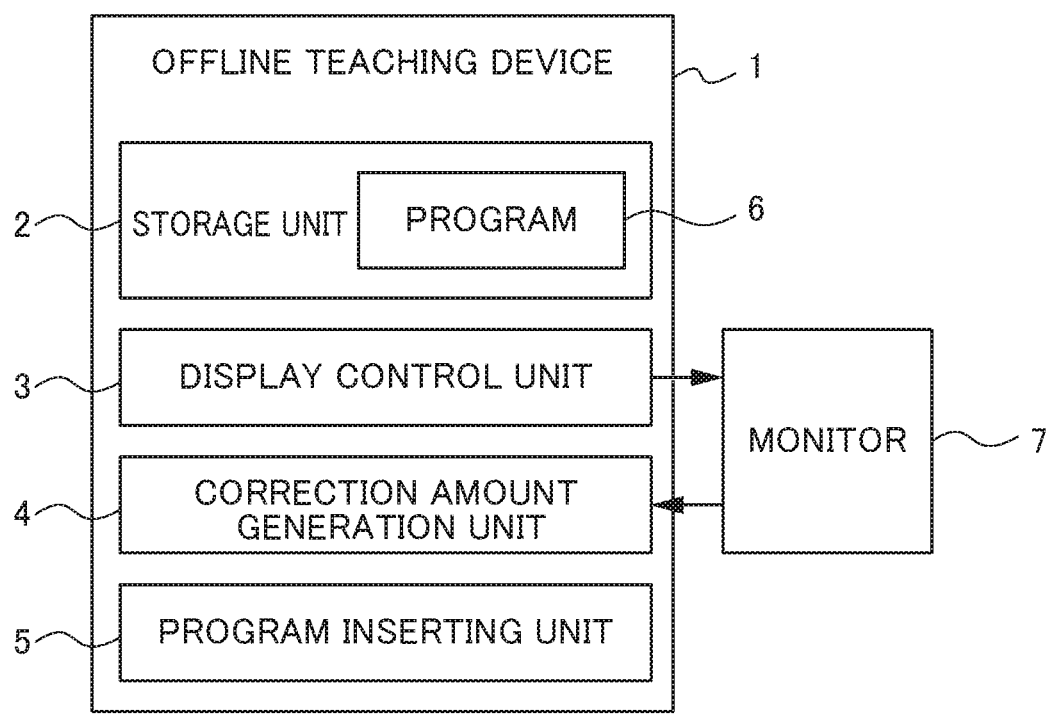
FIG. 1 is a block diagram illustrating a functional configuration of an offline teaching device for a robot according to an embodiment of the present invention.

Hereinafter, an embodiment of the present invention will be described with reference to the drawings. FIG. 1 is a block diagram illustrating a functional configuration of an offline teaching device for a robot according to an embodiment of the present invention.

An offline teaching device 1 illustrated in FIG. 1 is configured to teach an operation of a robot RO (see FIGS. 5 to 9) executing works such as welding, cutting, grasping, or transporting offline. The offline teaching device 1 is configured by installing necessary software in a CPU (a processor) of a computing machine such as a computer, for example, and includes a computer body, an input device such as a keyboard or a mouse, a display device such as a monitor, an interface connected to an external device, and the like. The offline teaching device 1 provides convenience to users in an operation of editing a line LI which is the trajectory of an operation of teaching a robot RO, for example. Specifically, the offline teaching device 1 includes a storage unit 2, a display control unit 3, a correction amount generation unit 4, and a program inserting unit 5.

The storage unit 2 stores a program 6 for causing the robot RO (see FIGS. 5 to 9) to perform a series of operations and teaching point data or the like of a teaching point of the robot RO. The teaching point of the robot RO means the position of a distal end of a hand in the case of a robot hand and means the position of a distal end of a tool such as a welding tool in the case of a welding robot.

The display control unit 3 controls display of a monitor (a display unit) 7 included in a personal computer or the like. Specifically, the display control unit 3 displays, on the monitor 7, a plurality of coordinate points P1, P2, P3, P4, P5, and P6 (see FIGS. 5 to 9) based on teaching point data described in the program 6 and one line LI (see FIGS. 5 to 9) connecting the plurality of coordinate points P1 to P6 successively. This line preferably is the trajectory of an operation taught to the robot but is not limited thereto. For example, the line may connect the coordinate points just along a straight line.

When the line LI is edited, an input operation such as a drag using a cursor 8 (see FIGS. 5 to 9) is performed on the monitor 7. However, the correction amount generation unit 4 generates correction amounts of the coordinate points P1 to P6 without changing the teaching point data stored in the storage unit 2.

The program inserting unit 5 inserts the correction amount data generated by the correction amount generation unit 4 to the program 6.

Next, the content described in the program 6 will be described with reference to FIGS. 2 and 3. FIG. 2 is a diagram illustrating the program 6 before the correction amount data is inserted. FIG. 3 is a diagram illustrating the program 6 after the correction amount data is inserted.

In the program 6 illustrated in FIG. 2, "1: Each Shaft Position [1] 100% Registration" on the first line indicates a command "move to coordinate point P1 at a speed of 100% for each shaft". In the program 6 illustrated in FIG. 2, "4: Straight line @Pos [4] 200 mm/sec Registration" on the fourth line indicates a command "move to coordinate point P4 at distal end speed of 200 mm/sec along straight line". Here, "@" means that a current position of the distal end of the robot RO displayed on the monitor 7 is the coordinate point P4.

The program 6 illustrated in FIG. 3 is the program 6 illustrated in FIG. 2 in which the correction amount data generated by the correction amount generation unit 4 is inserted to the second and seventh lines by the program inserting unit 5 and the third to sixth lines sandwiched between the two lines are correction targets. In the program 6 illustrated in FIG. 3, "2: Position Correction (1, 125.3, −50, 45.2)" on the second line means that a correction target starts from the third line immediately after the second line and indicates a command "correct the respective positions of the correction target coordinate points P2 to P5 to positions moved by 125.3 in the X-direction, −50 in the Y-direction, and 45.2 in the Z-direction on a tool coordinate system (the first coordinate system selected among a number of coordinate systems)".

"7: Position Correction (1, 0, 0, 0)" on the seventh line means that the correction target ends at the sixth line immediately before the seventh line.

Figure 5:
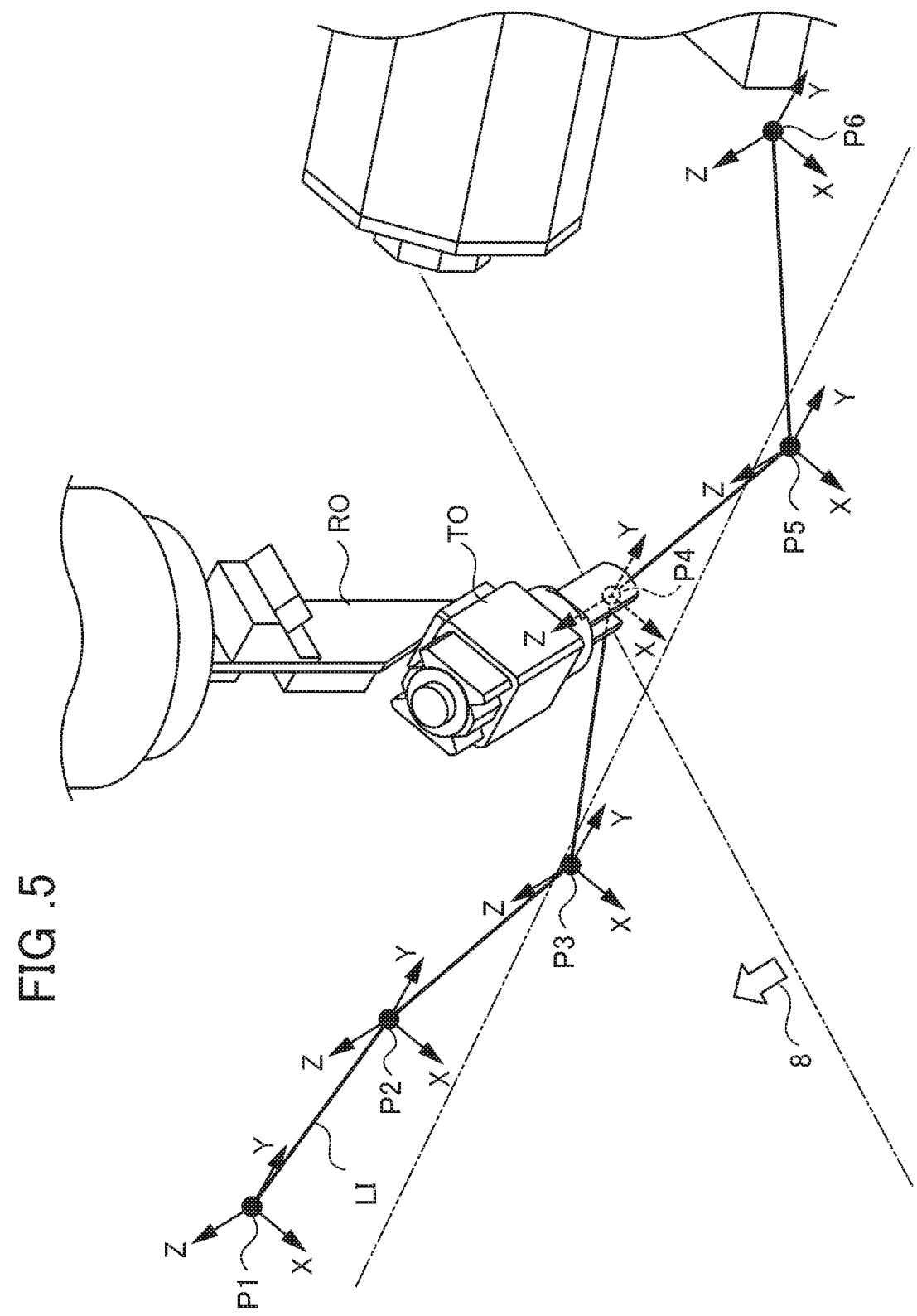
FIG. 5 is a diagram illustrating a simulation screen displayed on a monitor and illustrates a state in which a plurality of coordinate points and a line are displayed.
Figure 6:
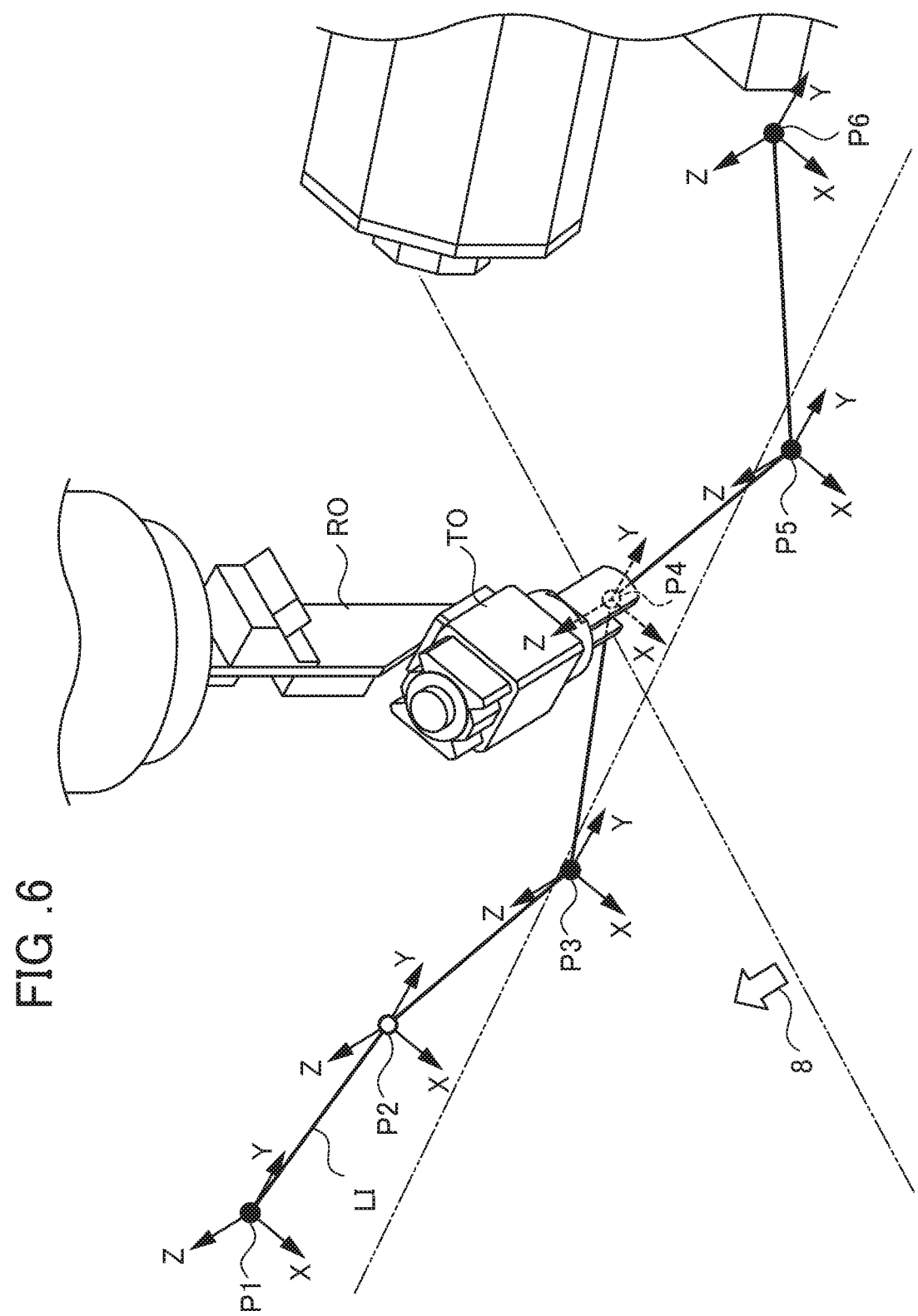
FIG. 6 is a diagram illustrating a simulation screen displayed on a monitor and illustrates a state in which after a plurality of coordinate points and a line are displayed, a first coordinate point is selected.
Figure 7:
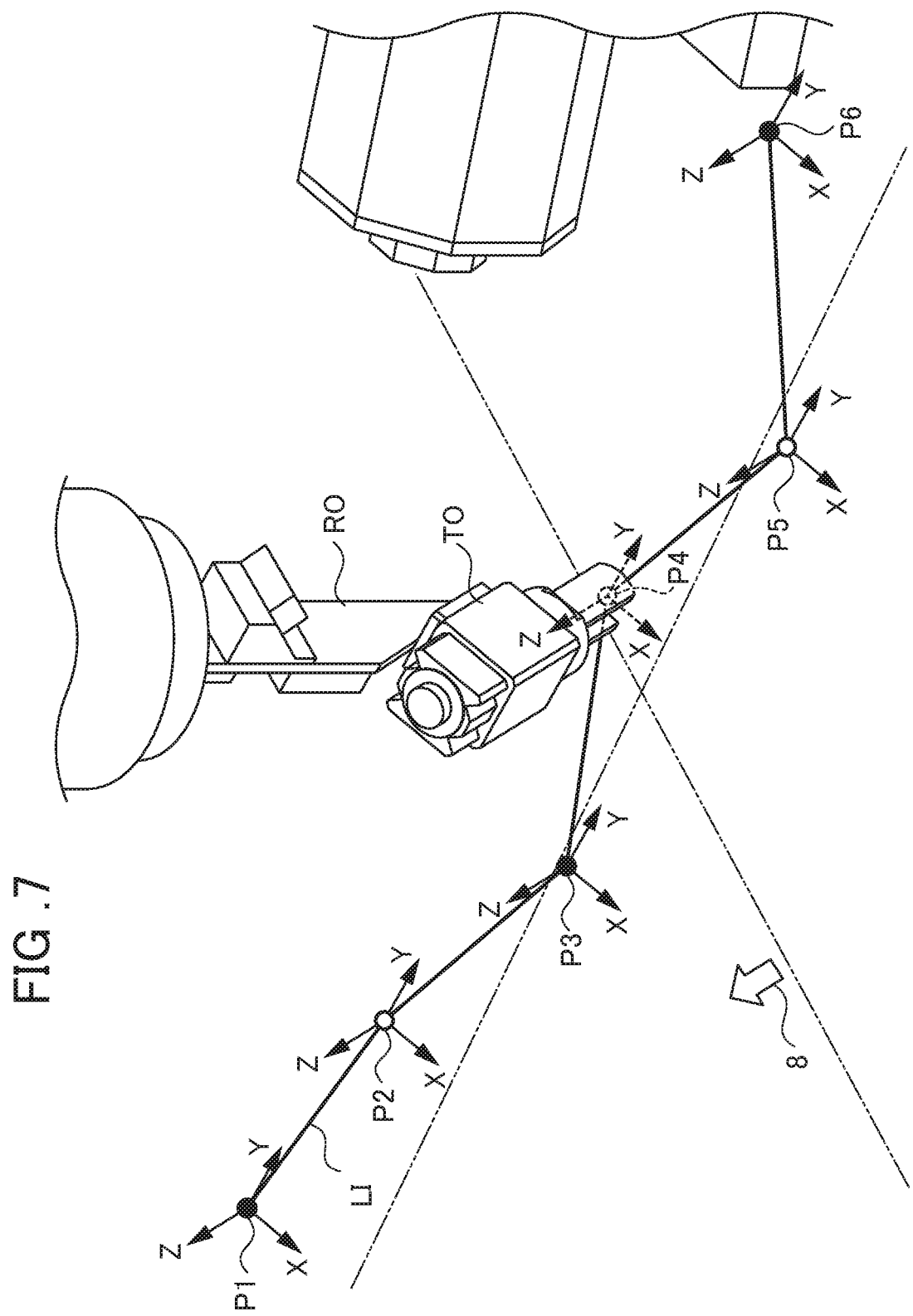
FIG. 7 is a diagram illustrating a simulation screen displayed on a monitor and illustrates a state in which after a plurality of coordinate points and a line are displayed, first and second coordinate points are selected.
Figure 8:
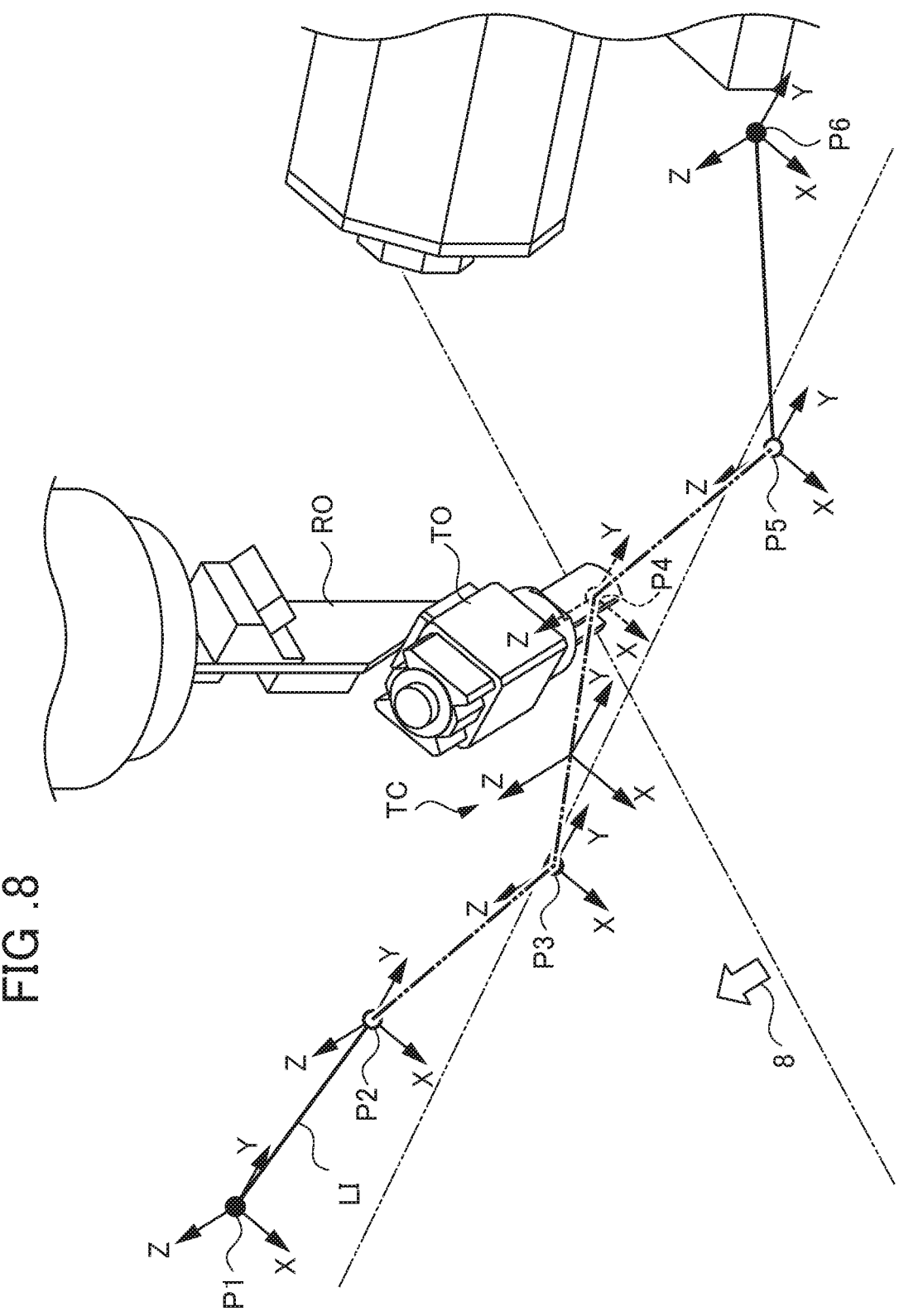
FIG. 8 is a diagram illustrating a simulation screen displayed on a monitor and illustrates a state in which after a plurality of coordinate points and a line are displayed, first and second coordinate points are selected, and a segment of a line between the selected two coordinate points can be dragged by a cursor.
Figure 9:
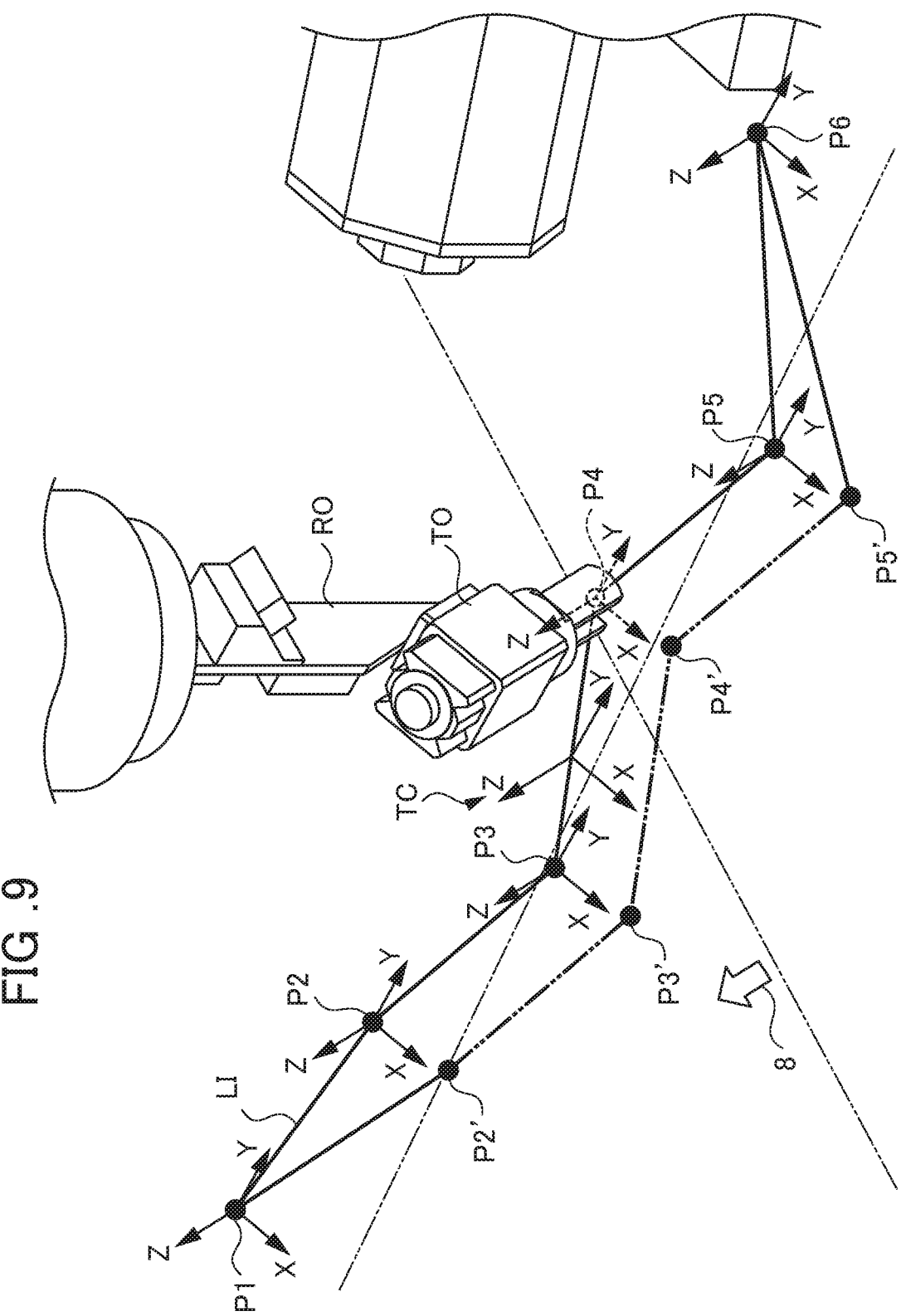
FIG. 9 is a diagram illustrating a simulation screen displayed on a monitor and illustrates a state in which after a plurality of coordinate points and a line are displayed and first and second coordinate points are selected, a segment of a line between the selected two coordinate points is not yet dragged by a cursor, illustrating a state after the segment is dragged by a cursor by a broken line.

Next, an input operation using the monitor 7 will be described with reference to FIGS. 4 to 9. FIG. 4 is a flowchart illustrating the procedure of an input operation of the offline teaching device 1. FIG. 5 is a diagram illustrating a simulation screen displayed on the monitor 7 and illustrates a state in which a plurality of coordinate points P1 to P5 and the line LI are displayed. FIG. 6 is a diagram illustrating a simulation screen displayed on the monitor 7 and illustrates a state in which after the plurality of coordinate points P1 to P6 and the line LI are displayed, the first coordinate point P2 is selected. FIG. 7 is a diagram illustrating a simulation screen displayed on the monitor 7 and illustrates a state in which after the plurality of coordinate points P1 to P6 and the line LI are displayed, the first and second coordinate points P2 and P5 are selected. FIG. 8 is a diagram illustrating a simulation screen displayed on the monitor 7 and illustrates a state in which after the plurality of coordinate points P1 to P6 and the line LI are displayed, the first and second coordinate points P2 and P5 are selected, and a segment of the line LI between the selected two coordinate points P2 and P5 can be dragged by the cursor 8. FIG. 9 is a diagram illustrating a simulation screen displayed on the monitor 7 and illustrates a state in which after the plurality of coordinate points P1 to P6 and the line LI are displayed and the first and second coordinate points P2 and P5 are selected, a segment of the line LI between the selected two coordinate points P2 and P5 is not yet dragged by the cursor 8, illustrating a state after the segment is dragged by the cursor 8.

As illustrated in FIG. 4, an input operation of an operation of editing the line LI in the offline teaching device 1 includes a first coordinate point selection step S100, a second coordinate point selection step S200, a coordinate system selection step S300, and a segment moving step S400.

First, a user presses a menu or a button to enter a correction mode in which correction teaching is performed. When the correction mode starts, as illustrated in FIG. 5, the display control unit 3 (see FIG. 1) displays four or more coordinate points P1 to P6 based on the teaching point data described in the program 6 (see FIG. 1) and one line LI connecting these four or more coordinate points P1 to P6 successively on a simulation screen displayed on the monitor 7 on which the cursor 8 is displayed. In this case, a tool coordinate system set to a distal end of a welding tool TO or the like is displayed at the respective coordinate points P1 to P6.

In S100, after the coordinate points P1 to P6 and one line LI are displayed, as illustrated in FIG. 6, a user clicks on a position indicated by the cursor 8 by operating a mouse or the like whereby a first coordinate point P2 is selected among remaining coordinate points P2 to P5 except the coordinate points P1 and P6 serving as the starting point and the ending point of the line LI. In this case, as illustrated in the drawing, the selected coordinate point is displayed as an open dot, for example (the same hereinbelow).

In S200, after the first coordinate point P2 is selected, as illustrated in FIG. 7, the user clicks on a position indicated by the cursor 8 by operating a mouse or the like whereby the second coordinate point P5 is selected among the remaining coordinate points P2 to P5 except the coordinate points P1 and P6 serving as the starting point and the ending point of the line LI.

In S300, after the two coordinate points P2 and P5 are selected, one coordinate system among a plurality of coordinate systems is selected. A tool coordinate system, a world coordinate system, a local coordinate system, and the like are prepared as the plurality of coordinate systems, and in this example, it is assumed that the tool coordinate system is selected. When the tool coordinate system is selected, a teaching point in the selected segment corresponding to the selected tool coordinate system is designated.

When the coordinate system is selected, as illustrated in FIG. 8, a state in which the segment of the line LI between the selected two coordinate points P2 and P5 can be moved by being dragged by the cursor 8 according to the selected coordinate system is created. In this case, the segment of the line LI between the selected two coordinate points P2 and P5 is displayed in a different manner so as to be clearly distinguished from other segments (the segment is displayed as a two-dot chain line in FIG. 8).

In this case, although the selected coordinate system is displayed, the displaying position is not particularly limited. For example, the coordinate system may be displayed to be superimposed on the teaching point between P2 and P5. When the selected coordinate system is a tool coordinate system, the user can clearly understand a teaching point corresponding to the selected coordinate system. Alternatively, the selected coordinate system may be displayed within the segment of the line LI between P2 and P5. By avoiding the teaching point, the user may perform a dragging operation easily.

In the case of a tool coordinate system, since a tool coordinate system is already displayed within the selected segment as described above, the coordinate system may be displayed in a highlighted manner. Alternatively, as illustrated in FIG. 8, the selected tool coordinate system TC may be displayed within the segment of the line LI between the selected two coordinate points P2 and P5. More specifically, the selected tool coordinate system TC may be displayed at a position avoiding the respective teaching points so as not to overlap the transmission systems which are also displayed at the respective coordinate points P1 to P6. When the selected coordinate system is displayed in this manner, the user can understand a draggable direction clearly.

In S400, after the segment of the line LI between the selected two coordinate points P2 and P5 is made draggable, the user drags the segment using the cursor 8 as illustrated in FIG. 9. In the example illustrated in FIG. 9, the segment is dragged along the X-axis direction of the tool coordinate system TC selected in S300 whereby the segment of the line LI between the selected two coordinate points P2 and P5 is moved in parallel in the X-axis direction of the tool coordinate system TC. In this case, the teaching points that are not selected (that is, the positions of the starting point P1 and the ending point P6) remain in a fixed state, and the positions of the starting point P1 and the ending point P6 are not changed.

The correction amount generation unit 4 (see FIG. 1) generates the correction amounts of the coordinate points P2 to P5 on the basis of the drag-based movement amount, and the program inserting unit 5 (see FIG. 1) inserts the generated correction amount data to the program 6 automatically (see FIG. 3). In this case, the coordinates of the coordinate points P2' to P5' after movement are stored in the storage unit 2 automatically. After that, the user exits the correction mode by operating a menu, keys, or the like.

As described above, according to the present embodiment, it is possible to correct the program 6 of an entire segment designated in the trajectory of the operation of the robot RO. Moreover, since it is possible to perform an operation of editing the line LI on the simulation screen, the user can easily understand how the route will be corrected actually. Since the correction amount data is inserted to the program automatically and the original teaching point data is maintained without being corrected, the data can be managed conveniently.

Since the tool coordinate system is selected among a plurality of coordinate systems and the entire segment designated in the trajectory of the operation of the robot RO is corrected by being moved according to the selected tool coordinate system, when the operation trajectory is a curve having a constant radius of curvature, for example, the curve can be corrected by one operation if the selected coordinate axis of the tool coordinate system is a radial direction.

While an embodiment of the present invention has been described, the present invention is not limited to the above-described embodiment. The advantageous effects described in the present embodiment are only examples of most preferable effects produced by the present invention, and the advantageous effects of the present invention are not limited to those described in the present embodiment.

EXPLANATION OF REFERENCE NUMERALS

1: Offline teaching device
2: Storage unit
3: Display control unit
4: Correction amount generation unit
5: Program inserting unit
6: Program
7: Monitor (Display unit)
8: Cursor
RO: Robot
TO: Tool
P1, P2, P3, P4, P5, P6: Coordinate point
LI: Line
S100: First coordinate point selection step
S200: Second coordinate point selection step
S300: Coordinate system selection step
S400: Segment moving step

What is claimed is:

1. An offline teaching device for a robot, for teaching an operation of the robot offline, comprising:
    a storage unit that stores a program for causing the robot to perform an operation;
    a display control unit that causes a display unit on which a cursor is displayed to display four or more coordinate points based on teaching point data described in the program and causes the display unit to display one line connecting the four or more coordinate points successively; and
    a correction amount generation unit that, after two coordinate points are selected on the display unit from remaining coordinate points except the coordinate points serving as a starting point and an ending point of the line and one coordinate system is selected among a plurality of coordinate systems, generates correction amounts of the coordinate points without changing the teaching point data on the basis of dragging of a segment of the line between the selected two coordinate points by the cursor according to the selected coordinate system.

2. The offline teaching device according to claim 1, further comprising:
    a program inserting unit that inserts the correction amount data to the program.

3. The offline teaching device according to claim 1, further comprising:
    the correction amount generation unit selects a tool coordinate system among the plurality of coordinate systems.

4. The offline teaching device according to claim 2, wherein
    the correction amount generation unit selects a tool coordinate system among the plurality of coordinate systems.

5. The offline teaching device according to claim 1, wherein
    the line connecting the coordinate points successively is a trajectory of an operation taught to the robot.

6. The offline teaching device according to claim 2, wherein
    the line connecting the coordinate points successively is a trajectory of an operation taught to the robot.

7. The offline teaching device according to claim 3, wherein
    the line connecting the coordinate points successively is a trajectory of an operation taught to the robot.

8. The offline teaching device according to claim 4, wherein
    the line connecting the coordinate points successively is a trajectory of an operation taught to the robot.

* * * * *